July 29, 1924.
D. TENNEY
1,503,390
PARING MACHINE
Filed April 1, 1922
3 Sheets-Sheet 1
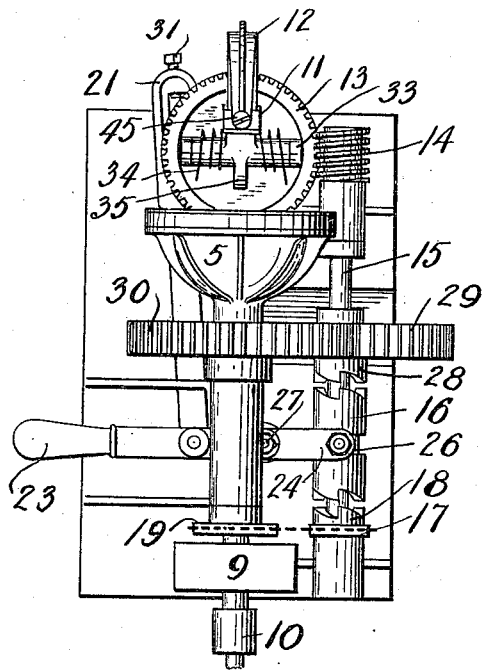
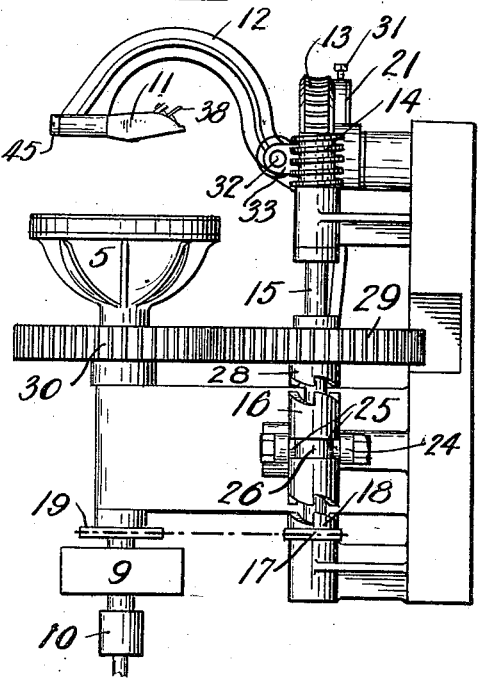
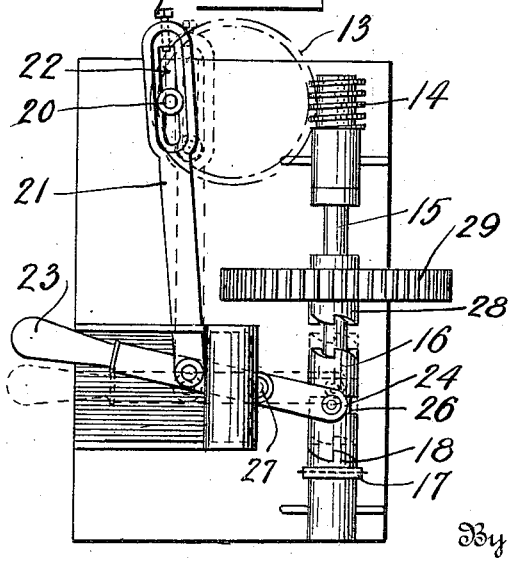
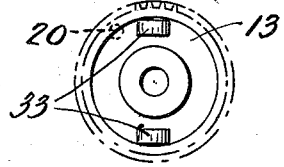
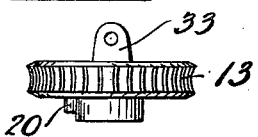

July 29, 1924.
D. TENNEY
1,503,390
PARING MACHINE
Filed April 1, 1922    3 Sheets-Sheet 2
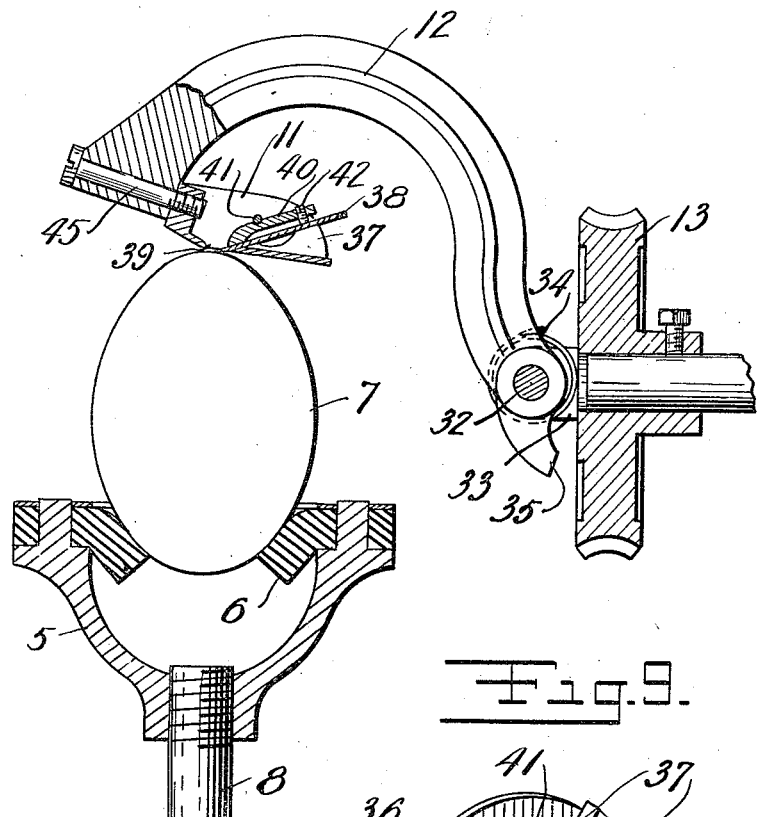
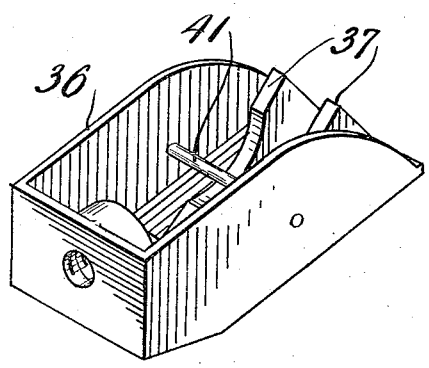
Inventor
Dwight Tenney
By his Attorney July 29, 1924.
D. TENNEY
PARING MACHINE
Filed April 1, 1922   3 Sheets-Sheet 3
1,503,390
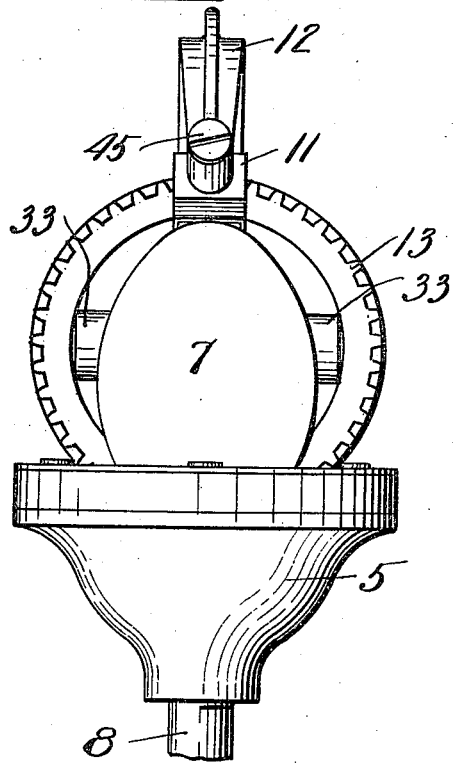
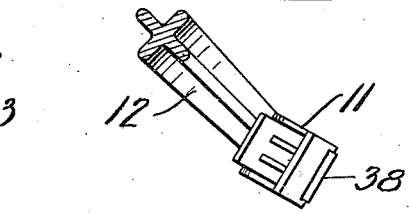
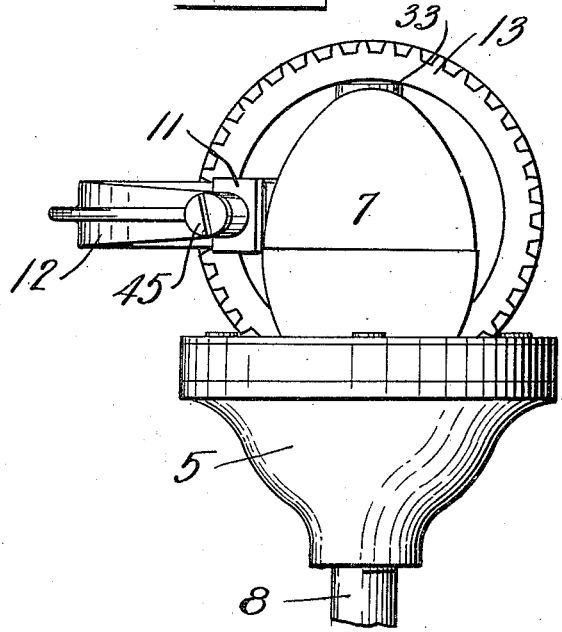

Patented July 29, 1924.

1,503,390

UNITED STATES PATENT OFFICE.

DWIGHT TENNEY, OF NEW YORK, N. Y., ASSIGNOR TO FRANKLIN BAKER COMPANY, OF PHILADELPHIA, PENNSYLVANIA.

PARING MACHINE.

Application filed April 1, 1922. Serial No. 548,882.

*To all whom it may concern:*

Be it known that I, DWIGHT TENNEY, a citizen of the United States, residing at New York, in the county of New York and State of New York, have invented certain new and useful Improvements in Paring Machines, of which the following is a specification.

This invention relates generally to paring machines and particularly to a device especially adapted for paring coconuts.

In my prior application Serial No. 488,734, filed July 30th, 1921, a machine of this general nature is disclosed in which a pair of oppositely disposed clutch members are arranged to automatically engage and hold in alternation the opposite ends of a coconut and to rotate the nut while a paring device swinging through an arc of substantially 180 degrees traverses the length of the surface of the nut from one end to the other. This machine has satisfactorily solved the problem of paring coconuts by mechanical means. The present invention relates to an improved machine for the same general purpose and is characterized by a relatively great simplicity of construction, and a corresponding certainty, speed and effectiveness in operation.

The present invention is further characterized by a simplified structure in which a coconut is held at one end in a rotatable vacuum chuck while a paring device traverses the surface of the nut from the free end to a point substantially midway between the ends whereupon the traversing movement of the paring device is automatically stopped to permit the attendant to reverse the half pared nut in the chuck and cause the paring device to reverse its traverse and perform a paring operation on the unpared half of the nut.

Other features of the invention will be hereinafter referred to.

In the drawings, in which a preferred form of the invention is illustrated,

Figure 1 is a plan view of a paring device embodying the invention.

Figure 2 is a view in side elevation of the device shown in Figure 1.

Figure 3 is a view similar to Figure 1 but with certain parts removed to show the operation of underlying parts.

Figure 4 is a plan view of an operating gear for a paring device included in the machine.

Figure 5 is a side view of the gear shown in Figure 4.

Figure 6 is a view in section on an enlarged scale of a portion of the device illustrative of the paring operation.

Figure 7 is a view in front elevation of the detail shown in Figure 6 showing the position of the paring device at the beginning of an operation.

Figure 8 is a view similar to Figure 7 showing the position of the paring device at the completion of a paring operation covering one half of the nut.

Figure 9 is a view in perspective of a paring device used in the machine with the cutter removed.

Figure 10 illustrates a detail having an angular position possible to be taken by the paring device.

Referring to the drawings in greater detail, a paring machine is shown which includes a rotatable chuck 5 of the suction or vacuum type. The chuck 5 is provided with an inwardly directed flange 6 of yielding material such as rubber as indicated in Figure 6 of the drawing, the yielding material accommodating itself to the irregular surface of a nut 7 and producing a sufficiently air-tight joint to cause the partial vacuum produced in the clutch head through the exhaust pipe 8 to hold the nut firmly in its seat.

The chuck 5 including the exhaust pipe 8 are rotated through a driving pulley 9 from any suitable source of power, the other extremity of the exhaust pipe 8 being journaled for rotation in a stuffing box 9 carried by the pipe 10 leading to a pump or other exhausting source.

In addition to the chuck or nut holding device 5 which holds and rotates an individual nut during a paring operation, a paring device 11 is provided which is carried by an arm 12 mounted on a gear 13 which is rotatable about an axis at substantially right angles to the axis of rotation of the chuck 5 and the work held thereby. In operation the arm 12 and the paring device 11 carried thereby are progressively moved through an arc of substantially ninety degrees to thereby effect a traversing motion of the paring device from a normal position in engagement with the free end of the nut as in Figures 6 and 7 to a position substantially midway between the ends of the nut as in Figure 8.

Means for rotating the spiral gear 13 which carries the arm 12 and produces the traversing motion of the paring device 11 consists of a worm gear 14 meshing with the spiral gear 13 at its periphery. The worm gear 14 is carried by a shaft 15 with which the movable member 16 of a clutch has a splined connection. A sprocket wheel 17 carried by the clutch member 18 which is immovable longitudinally of the shaft 15, and which rotates freely on the shaft 15 is driven through a chain connection with the sprocket wheel 19 on the main drive shaft. In Figure 3 of the drawing the clutch member 16 is shown as being in engagement with the clutch member 18 to thereby produce a driving connection with the shaft 15 and spiral gear 13 as will be clear.

When the paring operation has proceeded to the point indicated in Figure 8 where the arm 12 and paring device have been swung through an arc of approximately ninety degrees a stud 20 projecting downwardly from the underside of the gear 13 has moved a clutch shifting device 21 to a position from the one shown in full lines in Figure 3 to the position shown in dotted lines in the same figure. This operation of the clutch shifting device is brought about by the engagement of the downwardly projecting stud 20 referred to in a slot 22 at one end of the clutch shifting lever 21. The member 21 is connected at its other end to a hand lever 23 which is provided at its other end with a forked formation 24 having inwardly projecting studs 25 for engagement with the groove 26 on the movable clutch member 16. It will be clear that the swinging of the lever 23 about its fulcrum 27 will cause a corresponding movement of the clutch member 16 along the shaft 15.

The movement of the hand lever 23 and the clutch member 16 to the dotted line position shown in Figure 3 of the drawing by the rotation of the gear wheel 13 and the stud 20 carried thereby through an arc of approximately ninety degrees operates to move the clutch member 16 out of engagement with the clutch member 18 to a neutral position in which no driving connection is had with the shaft 15. The cessation of further traversing motion of the paring device 11 is a signal for the attendant to move the hand lever 23 to a position which will move the clutch member 16 into engagement with a clutch member 28, the member 28 being immovable longitudinally of the shaft 15. The clutch member 28 is fixed for rotation with a gear wheel 29 which meshes with a gear wheel 30 carried by the main driving shaft. It will be seen that the connection of the clutch member 16 with the clutch member 28 serves to convey rotative movement from the main drive shaft through the clutch member 16 to the shaft 15 and that the direction of rotation of the shaft when thus driven is the reverse of the direction of the shaft when the driving is by way of the clutch member 18 and the sprocket chain connection with the main drive shaft. This reverse direction of rotation of the shaft 15 operates, as will be seen, to swing the arm 12 carried by the gear 13 through a reverse direction of movement, thereby performing a paring operation in the opposite direction. Meanwhile the attendant has turned the work end for end in its seat so that the reversed paring operation is performed from a point midway between the ends of the work to the free end thereof.

The stud 20 carried by the gear wheel 13 has been moved to engage the end of a screw 31 carried by the shifting device 21 at the opposite end of the slot 22. The engagement of the stud with the screw 31 serves to lift the shifting device and to move the hand lever 23 from the position in which the clutch member 16 was caused to engage the clutch member 28 to the neutral position shown in dotted lines in the same figure. It will be clear that this operation has again stopped the movement of the paring device and that this cessation of operation marks the completion of the second stage of the paring operation on the work.

In order to accommodate the cutter to varying curvatures on the surface of the nut and also to maintain as constant a pressure as can be maintained against the nut in the cutting operation the arm 12 which carries the paring device is pivoted or hinged at its base on a pintle member 32 seated in a pair of oppositely disposed lugs 33 on the gear wheel 13. A spring member 34 is so arranged as to bear against the arm 12 and press the arm and the paring device carried thereby into engagement with the work. It will be seen that the swinging of the cutting blade through an arcuate path of movement tends also to bring about a constant pressure of the paring device against the work throughout its path of engagement therewith. Preferably a stop lug 35 carried by the end of the arm 12 prevents abnormal swinging of the arm under the pressure of the spring 34 when no work is in place in the chuck.

Preferably the paring device consists of a framework 36 as shown in Figure 9 of the drawing and seats or ways 37 are provided within the framework 36 on which the cutting blade 38 is placed, the angle of the faces of the seats 37 being such as to press the cutting edge of the cutting blade in the proper angular position beneath the slot 39 to effectively perform its work. The cutter blade is held to its seat by a pressure plate or lever 40 which is inserted in place in the framework underneath a cross rod 41 and which is caused to press against the cutter blade 38 with a desired pressure by the adjustment of a set screw 42. In order to more effectively utilize the cutting action of the cutter blade 38 the blade has a width substantially the same as that of the framework or head 36 in which it is carried. This not only provides a satisfactory width of cut which is particularly useful at the beginning and finishing of a paring operation but the relatively great width of the cutting blade prevents the undesirable engagement of the extreme corners or edges of the blade with the work.

The cutting action is further facilitated and a desirable thin paring produced by the particular connection employed by the paring device 11 and the end of the arm 12 on which the paring device is mounted. This connection includes an elongated bolt member 45 which extends transversely through the end of the arm 12 and is free to rotate about its axis in its seat in the arm. This, as will be seen, provides for the rocking or rotation of the paring device about its longitudinal axis thereby causing the paring device to adapt itself freely to irregularities and changing curvatures in the surfaces with which it is engaged. An example of an angular relation between the paring device and the arm by which it is held is indicated in Figure 10 of the drawing.

It will be seen that I have provided a paring machine for the particular purpose specified which is characterized by relatively great simplicity of construction, which is automatically operable where automatic operation is desirable and with which paring operations can be effectively performed at a relatively high speed.

What is claimed is:

1. In a machine for paring coconuts, a rotatable chuck for engaging and holding one end of a coconut, a paring device, means for rotating the chuck, and means for moving the paring device relative to the coconut and through an arcuate path to cause the paring device to traverse the surface of the work from the free end thereof to a point substantially midway between the ends, and means for reversing the direction of movement of the paring device whereby when the work is turned end for end in its seat the unpared portion is operated on.

2. In a machine for paring coconuts, a rotatable vacuum chuck for engaging and holding one end of a coconut, a paring device, means for rotating the chuck and the work held thereby, and means for moving the paring device through an arcuate path having approximately the curvature of the nut and having a length of substantially ninety degrees, said paring device engaging the surface of the work in its movement.

3. In a machine for paring coconuts, a rotatable chuck for engaging and holding one end of a coconut, a paring device, means for rotating the chuck and the work held thereby, means for moving the paring device through an arcuate path crossing the path of travel of the rotating surface of the work from the free end of the work to a point substantially midway between the ends, means for reversing the direction of movement of the paring device whereby when the work is turned end for end in its seat the unpared portion is operated on and spring means for holding the paring device in engagement with the surface of the work.

4. In a machine for paring coconuts, a rotatable chuck for engaging and holding one end of a coconut, means for rotating the chuck, a paring device, means for moving the paring device through a curved path to cause the paring device to traverse the surface of the work from the free end thereof to a point substantially midway between the ends, and means for automatically stopping the movement of the paring device at a point substantially between the ends of the work, whereby an attendant may reverse the position of the work in the chuck and reverse the direction of movement of the paring device to perform the remaining portion of the paring operation.

5. In a machine for paring coconuts, a rotatable chuck for engaging and holding one end of a coconut, means for rotating the chuck, a paring device, means for moving the paring device along the surface of the work from the free end thereof to a point substantially midway between the ends, means for automatically stopping the movement of the paring device at a point substantially midway between the ends of the work, and means for reversing the direction of movement of the paring device whereby when the work has been reversed in its seat the remaining portion of the paring operation will be completed.

6. In a machine for paring coconuts, a rotatable chuck for engaging and holding one end of a cocoanut, means for rotating the chuck, a paring device, means for moving the paring device along the surface of the work until substantially one half the surface of the work has been pared, and means for reversing the direction of movement of the paring device whereby when the work is turned end for end in its seat the unpared portion will be operated on.

7. In a machine for paring coconuts, a rotatable chuck for engaging and holding one end of a coconut, means for rotating the chuck, a paring device, means for moving the paring device along the surface of the work from the free end thereof to a point substantially between the ends, means whereby the work may be turned end for end in the chuck, and means for causing the paring device to move along the surface of the work from the midway position to the free end thereof to pare the remaining portion of the work.

8. In a machine for paring coconuts, a rotatable chuck for engaging and holding one end of a coconut, means for rotating the chuck, a paring device, means for moving the paring device in an arcuate path to cause the device to traverse the surface of the work from the free end thereof to a point substantially midway between the ends, means for automatically stopping the movement of the paring device, and means under the control of the operator for reversing the direction of movement of the paring device, whereby when the work is turned end for end in the chuck the paring device will move from a point midway between the ends to the free end of the nut to complete the paring operation.

9. In a paring machine, a rotatable work holding chuck to support an article at one end, an arm having arcuate movement about an axis transverse to the axis of rotation of the chuck, a paring device carried by said arm for operative engagement with the rotatably supported article from the free end thereof to a point midway between the ends of the article, and means for reversing the direction of movement of the paring device whereby when the work is turned end for end in its seat the unpared portion is operated on.

10. In a paring machine, a rotatable work holding chuck, a gear member mounted for rotation about an axis transverse to the axis of rotation of the chuck, said gear member having outstanding lugs, a pintle on said lugs and an arm mounted on the pintle whereby said arm has its free end offset from the axis of rotation whereby to move in a curved path longitudinally of the work, and a paring device carried by the free end of the arm for operatively engaging the work at a point in substantial alinement with the axis of the rotation of the chuck.

11. A paring device for a paring machine comprising, a frame piece having a slot in its work engaging surface, slanting seats in said frame piece, a cutting blade mounted on said seats with its cutting edge projecting through the slot for engagement with the work, a pivot pin projecting from the end of said frame piece, a pressure plate in said frame provided with a set screw and a cross rod on the pressure plate for holding said blade in adjustable position on said seats, and a pivotal support for the pivot pin whereby the paring device will follow irregularities in the contour of the engaged surface.

12. In a machine for paring coconuts, a chuck having an inwardly directed flange of yieldable material for yieldingly engaging and holding one end of a coconut, a paring device above said chuck, means for rotating the chuck, and means for moving the paring device over the surface of the coconut from the free end thereof to a point substantially midway between the ends.

13. In a machine for paring coconuts, a chuck having an inwardly directed flange of yieldable material for yieldingly engaging and holding one end of a coconut, a paring device above said chuck, means for rotating the chuck, and means for moving the paring device longitudinally over the surface of the coconut from the free end thereof to a point substantially midway between the ends.

14. In a machine for paring coconuts, a rotatable chuck having an inwardly directed flange of yieldable material for yieldingly engaging and holding one end of a coconut, a paring device above said chuck, means for rotating the chuck and the work held thereby, and means for moving the paring device from the free axial end of the coconut to a point midway between the ends, said paring device engaging the surface of the coconut in its movements.

15. In a machine for paring coconuts, a rotatable chuck having an inwardly directed flange of yieldable material for yieldingly engaging and holding one end of a coconut, a paring device above said chuck, means for rotating the chuck and the work held thereby, and means for moving the paring device over the free or unsupported end of the coconut, said paring device engaging the surface of the coconut in its movements.

16. In a machine for paring coconuts, a rotatable chuck having an inwardly directed flange of yieldable material for yieldingly engaging and holding one end of a coconut, a paring device above said chuck, means for rotating the chuck and the work held thereby, and means for longitudinally moving the paring device about the end and along the side of the coconut, said paring device engaging the surface of the coconut in its movements.

17. In a machine for paring coconuts, a rotatable chuck for supporting a coconut from one end, a rotatable shaft having driving connection with said chuck, a paring device having driving connection with the rotatable shaft and means associated with the shaft and driving connection for the paring device for reversing the direction of movement of the paring device.

18. In a machine for paring coconuts, a rotatable chuck for supporting a coconut from one end, means for rotating the chuck, a paring device, means for moving the paring device along the surface of the work until substantially one half of the surface of the work has been pared and a clutch member operable for reversing the direction of movement of the paring device whereby when the work is turned end for end in its seat the unpared portion is operated on.

19. In a machine for paring coconuts, a rotatable chuck for supporting a coconut from one end, a rotatable shaft having driving connection with said chuck, a paring device, a worm gear on said shaft, a gear member in mesh with said worm gear for operating the paring device, a clutch on the shaft and means associated with the clutch and paring device for shifting the clutch into neutral position and thereby stop the paring operation.

20. In a machine for paring coconuts, a rotatable chuck for supporting a coconut from one end, a rotatable shaft having driving connection with said chuck, a paring device, a worm gear on said shaft, a gear member in mesh with said worm gear for operating the paring device, a clutch on the shaft, means associated with the clutch and paring device for shifting the clutch into neutral position to stop the paring operation and a hand lever for shifting the clutch to reverse the movement of the paring device.

In testimony whereof I affix my signature.

DWIGHT TENNEY.